US012781310B2

(12) United States Patent
Tang et al.

(10) Patent No.: US 12,781,310 B2
(45) Date of Patent: Nov. 3, 2026

(54) BENEFICIATION METHOD FOR HIGH CLAY TYPE LOW-GRADE MANGANESE CARBONATE ORE

(71) Applicant: Guizhou University, Guizhou City (CN)

(72) Inventors: Yun Tang, Guiyang City (CN); Bo Wu, Guiyang City (CN); Guanghua Nie, Guiyang City (CN); Yong Yang, Guiyang City (CN); Zhengbin Deng, Guiyang City (CN)

(73) Assignee: Guizhou University, Guiyang City (CN)

( * ) Notice: Subject to any disclaimer, the term of this patent is extended or adjusted under 35 U.S.C. 154(b) by 330 days.

(21) Appl. No.: 18/669,599

(22) Filed: May 21, 2024

(65) Prior Publication Data

US 2025/0223668 A1 Jul. 10, 2025

(30) Foreign Application Priority Data

Jan. 8, 2024 (CN) ......................... 202410026420.0

(51) Int. Cl.

| | |
|---|---|
| ***C22B 47/00*** | (2006.01) |
| ***B03C 1/025*** | (2006.01) |
| ***C22B 1/24*** | (2006.01) |
| ***C22B 3/16*** | (2006.01) |
| ***C22B 3/22*** | (2006.01) |
| *B03B 1/04* | (2006.01) |
| *B03C 1/005* | (2006.01) |

(52) U.S. Cl.
CPC ................ *C22B 47/00* (2013.01); *C22B 1/24* (2013.01); *C22B 3/165* (2013.01); *C22B 3/22* (2013.01); *B03B 1/04* (2013.01); *B03C 1/005* (2013.01); *B03C 1/025* (2013.01)

(58) Field of Classification Search
CPC ........... C22B 47/00; C22B 3/165; C22B 3/22; C22B 1/00; B03C 1/025
See application file for complete search history.

(56) References Cited

PUBLICATIONS

Qin et al. "Utilization of polyepoxysuccinic acid as the green selective depressant for the clean flotation of phosphate ores". Journal of Cleaner Production. Feb. 1, 2021 vol. 282 Article 124532 (Year: 2021).*

* cited by examiner

*Primary Examiner* — Alexandra M Moore
(74) *Attorney, Agent, or Firm* — Cooper Legal Group, LLC

(57) ABSTRACT

The present invention discloses a beneficiation method for high clay type low-grade manganese carbonate ore. The method includes: first preparing a regulator, polyepoxysuccinic acid (PESA), into a solution; adding raw ore to a mill, where the raw ore is high clay type low-grade manganese carbonate ore; and meanwhile, adding PESA to the mill, and performing ore grinding on the raw ore, where an ore grinding fineness of less than 0.075 mm accounts for 54-70%; and then, sending an ore grinding product to magnetic separation operation, and performing a separation process involving one roughing and one scavenging by a high gradient magnetic separator to obtain a comprehensive manganese concentrate with a high grade and a high recovery rate.

3 Claims, 1 Drawing Sheet

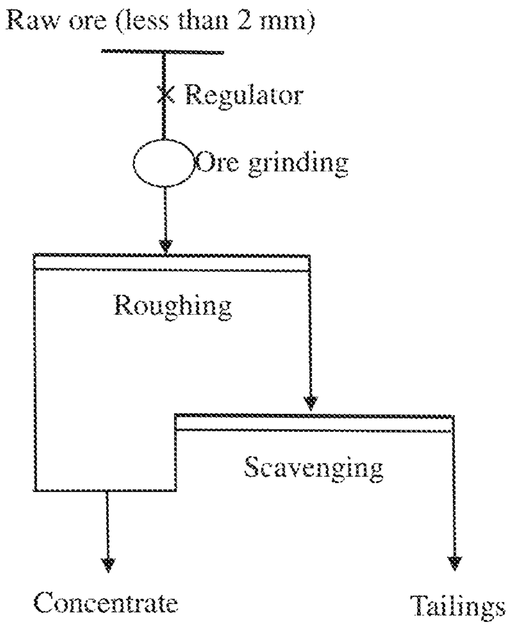
Raw ore (less than 2 mm)
Regulator
Ore grinding
Roughing
Scavenging
Concentrate
Tailings

BENEFICIATION METHOD FOR HIGH CLAY TYPE LOW-GRADE MANGANESE CARBONATE ORE

CROSS-REFERENCE TO RELATED APPLICATION

This application claims priority to Chinese Patent Application 202410026420.0, filed on Jan. 8, 2024, which is incorporated herein by reference.

FIELD OF TECHNOLOGY

The present invention relates to a beneficiation method for high clay type low-grade manganese carbonate ore, in particular to a beneficiation method with green environmental protection, high efficiency, a short process and decreased emission of manganese slag from the source.

BACKGROUND

China has a manganese ore source reserve of 2.1 billion tons, with manganese carbonate ore as a main mineral species at a grade of less than 30%, accounting for 26% of that in the global world. Guizhou Province has a reserve of 839 million tons, accounting for approximately 40% of that in China; and Guangxi Province has a reserve of 476 million tons, accounting for 22.7% of that in China. It has been discovered that Tongren City in Guizhou Province has a manganese ore source reserve of 740 million tons, accounting for 35.2% of that in China and 88.2% of that in the province, and has 4 super-large manganese ore deposits with a reserve of more than 100 million tons (a total of 13 super-large manganese ore deposits in the global world) and 1 extra-large manganese-rich ore deposit, with an ore grade of 11-22%, an average grade of about 16% and a grade of about 14% in actual production. Low-grade manganese carbonate ore has the characteristics of being lean, mixed and fine and the like, and has the ore characteristics of medium to high iron, high clay and the like. 8-10 tons of manganese slag are produced when 1 ton of metallic manganese is produced. In China, an annual increase amount of the manganese slag is greater than 10 million tons, and a cumulative storage amount of the manganese slag is 150 million tons or above. In a "manganese triangle" area, an annual increase amount of the manganese slag is one million tons, and a cumulative inventory storage amount of the manganese slag is greater than 12 million tons. Inventory storage of the manganese slag not only occupies a large amount of land, but also has serious water accumulation after long-term operation, leading to fluidization. Serious safety hazards are caused in a rainy season, and downstream water is seriously polluted by heavy metal ions. Therefore, in order to reduce the inventory storage pressure of the slag, reduce the cost of electrolytic manganese operation and increase the comprehensive recovery rate of manganese, it is urgent to adopt appropriate physical methods to efficiently separate manganese-containing minerals and silicon-containing gangue minerals, so as to achieve the purpose of green decreased emission of electrolytic manganese slag from the source.

At present, technologies for decreased emission of the low-grade manganese carbonate ore from the source mainly include physical beneficiation and chemical beneficiation. As the chemical beneficiation has a high production cost and environmental pollution, the chemical beneficiation is not recommended to use. The physical beneficiation includes ore washing, gravity separation and flotation. The flotation includes regulating a mineral interface by a chemical agent to achieve separation of rhodochrosite and gangue minerals. Compared with other physical beneficiation methods, the method has a higher production cost, and a flotation agent has a certain impact on the electrolytic manganese operation. The ore washing and the gravity separation can only achieve the purpose of restoring the geological grade by throwing away surrounding rocks or mud in beneficiation of the manganese carbonate ore. However, the rhodochrosite has brittleness and easy argillization, so that the comprehensive recovery rate of manganese is decreased. In summary, after sufficient liberation of the low-grade manganese carbonate ore, the weakly magnetic mineral rhodochrosite and the non-magnetic gangue minerals are separated in a strong magnetic field based on magnetic differences of the minerals, so that strong magnetic separation is an effective method. As the rhodochrosite has brittleness and easy argillization and the ore includes large amounts of clay minerals that easily cover an interface of the rhodochrosite or carry manganese ore mud, not only is the capture rate of a magnetic medium for the rhodochrosite decreased, but also some clay minerals adhere to surfaces of magnetic minerals and are selected as concentrate products after beneficiation, so that the grade and recovery rate of a magnetic separation manganese concentrate are decreased. Therefore, the key to improve beneficiation indicators of high clay type manganese carbonate ore is to effectively improve dispersion characteristics of ore pulp, so as to achieve dispersion between mineral particles, improve the flowability of viscous ore pulp and reduce the interference of slime on magnetic properties of the rhodochrosite. In short, in order to reduce the disposal pressure of the electrolytic manganese slag, it is necessary to achieve decreased emission of the electrolytic manganese slag from the source by physical methods. Existing technologies mainly have the following problems: complicated processes, addition of a variety of chemical agents, a low manganese recovery rate or low decrease of manganese slag from the source.

SUMMARY

The present invention aims to provide a beneficiation method for high clay type low-grade manganese carbonate ore, so as to achieve the purposes of green environmental protection, high efficiency, a short process and decreased emission of manganese slag from the source.

In order to achieve the above purposes, solutions used in the present invention are as follows.

A beneficiation method for high clay type low-grade manganese carbonate ore includes the following steps:

- step 1: preparing polyepoxysuccinic acid (PESA) into a solution with a concentration of 0.004 g/L;
- step 2: adding raw ore to a mill, where the raw ore is high clay type low-grade manganese carbonate ore with a clay mineral content of 18-24 wt % and a manganese grade of 10-13%; and meanwhile, adding 200-800 g/t of the PESA to the mill, and performing ore grinding on the raw ore, where an ore grinding fineness of less than 0.075 mm accounts for 54-70 wt %; and
- step 3: sending an ore grinding product obtained in step 2 to magnetic separation operation, and performing a separation process involving one roughing and one scavenging by a high gradient magnetic separator to obtain a comprehensive manganese concentrate with a high grade and a high recovery rate, where the roughing is performed in a magnetic field intensity range of 0.9-1.1 T, the scavenging is performed in a magnetic field intensity range of 1.3-1.5 T, and the high gradient magnetic separator has a magnetic medium of 2.5 mm and a magnetic separation pulsation frequency of 100-150 r/min.

After the above solutions are adopted, the present invention provides a green, efficient and short-process physical method for solving the problems of low beneficiation efficiency, difficulty in obtaining a high-grade manganese concentrate, a low recovery rate and the like caused by easy argillization and slime carrying and covering of high clay type low-grade manganese carbonate ore in Tongren City in an ore grinding process, so as to achieve decreased emission of electrolytic manganese slag from the source in Tongren City. In the present invention, the PESA is used as a regulator. The PESA is a phosphorus-free and nitrogen-free green and environmentally friendly water-soluble polymer with biodegradability, which has a strong chelating ability for metal ions, such as calcium ions, magnesium ions and iron ions. By adding a certain proportion (200-800 g/t) of the PESA to the mill to perform ore grinding on the low-grade manganese carbonate ore, dispersion characteristics of ore pulp are effectively improved, dispersion between mineral particles is achieved, the flowability of viscous ore pulp is improved, covering or carrying of rhodochrosite by clay minerals is reduced, particle aggregation is effectively suppressed, the argillization degree is decreased, the interference of an argillization phenomenon on magnetic separation of the rhodochrosite is reduced, and ore pulp with effective liberation of minerals is formed, so that convenience is provided for improving beneficiation indicators of a magnetic separation manganese concentrate, and the grade and recovery rate of the comprehensive manganese concentrate can be significantly increased by high gradient magnetic separation. Specifically, by adding a specific proportion of the PESA in combination with the magnetic separation process involving one roughing and one scavenging in an ore grinding process, the manganese grade can be increased by 6-7%, the manganese recovery rate is 87-93%, and the emission is decreased by 40-50% from the source. In short, the entire disposal process of the present invention is short and efficient, and magnetic separation tailings have a low grade. While ensuring efficient recovery of manganese-containing minerals in the ore, green and efficient decreased emission of the low-grade manganese carbonate ore from the source can be achieved.

BRIEF DESCRIPTION OF THE DRAWINGS

FIG. 1 is a diagram showing a technological process of the present invention.

DESCRIPTION OF THE EMBODIMENTS

As shown in FIG. 1, the present invention relates to a beneficiation method for high clay type low-grade manganese carbonate ore. The present invention is mainly used for beneficiation of raw ore with a clay mineral content of 18-24% and a grade of 10-13%. First, polyepoxysuccinic acid (PESA) is prepared into a solution with a concentration of 0.004 g/L. Then, raw ore (high clay type low-grade manganese carbonate ore) is added to a mill, and meanwhile, the PESA is also added to the mill, where 200-800 g of the PESA is added for per ton of the raw ore; and ore grind is performed in the mill, where an ore grinding fineness of less than 0.075 mm accounts for 54-70%. Then, an ore grinding product is sent to magnetic separation operation, and a separation process involving one roughing (0.9-1.1 T) and one scavenging (1.3-1.5 T) is performed by a high gradient magnetic separator (with a magnetic medium of 2.5 mm and a magnetic separation pulsation frequency of 100-150 r/min) to obtain a comprehensive manganese concentrate with a high grade and a high recovery rate.

In order to demonstrate that the argillization degree of the ore can be reduced and separation indicators of the magnetic separation concentrate can be significantly improved by adding the regulator PESA to the mill for ore grinding with the high clay type low-grade manganese carbonate ore, comparative tests were carried out before and after the PESA is added to the mill and at addition points. Results are shown in Table 1 and Table 2.

Firstly, argillization of the manganese carbonate ore can be reduced by adding the PESA to the mill. As shown in Table 1, when ore grinding is performed for 3 min after adding the PESA, the yield of particles with a particle size of 20-38 μm is decreased by about 3% (decreased from 49.31% to 46.13%), while the yield of particles with a particle size of less than 20 μm is decreased by nearly 2% (decreased from 38.55% to 36.74%).

Secondly, as shown in Table 2, the beneficiation indicators of the magnetic separation concentrate can be improved by adding the PESA in the ore grinding process. In particular, the recovery rate is significantly increased by 17.54%. When magnetic separation is performed after ore grinding and addition of the agent for action for a period of time, the recovery rate is increased by 11.09%. The results indicate that the present invention has a good gain effect in a magnetic separation process of the low-grade manganese carbonate ore. By comparing magnetic separation test results of PESA addition points, it is concluded that good benefits are achieved by adding the PESA to the mill, which is also an important innovation of the present invention.

TABLE 1

Comparison of particle size composition before and after PESA is added to a mill

| Test conditions | Particle size composition/μm | Yield/% Individual | Yield/% Accumulation | Grade/% Individual | Distribution rate/% Individual |
|---|---|---|---|---|---|
| Ore grinding without addition of PESA for 3 min | +125 | 21.55 | 100.00 | 13.06 | 24.24 |
| | +75-125 | 13.43 | 78.45 | 13.68 | 15.83 |
| | +38-75 | 15.71 | 65.01 | 12.57 | 17.00 |
| | +20-38 | 10.75 | 49.31 | 11.56 | 10.70 |
| | −20 | 38.55 | 38.55 | 9.71 | 32.23 |
| | Total | 100.00 | | 11.61 | |

TABLE 1-continued

Comparison of particle size composition before and after PESA is added to a mill

| Test conditions | Particle size composition/μm | Yield/% Individual | Yield/% Accumulation | Grade/% Individual | Distribution rate/% Individual |
|---|---|---|---|---|---|
| Ore grinding with addition of PESA for 3 min | +125 | 24.31 | 100.00 | 12.67 | 26.58 |
| | +75-125 | 16.48 | 75.69 | 13.36 | 19.00 |
| | +38-75 | 13.07 | 59.21 | 12.79 | 14.43 |
| | +20-38 | 9.39 | 46.13 | 11.48 | 9.30 |
| | −20 | 36.74 | 36.74 | 9.68 | 30.69 |
| | Total | 100.00 | | 11.59 | |

TABLE 2

Comparative test of agent addition points

| Test conditions | Product name | Yield/% Individual | Yield/% Accumulation | Mn grade/% Individual | Mn grade/% Accumulation | Mn recovery rate/% Individual | Mn recovery rate/% Accumulation |
|---|---|---|---|---|---|---|---|
| Addition of PESA in ore grinding | Concentrate | 46.76 | 46.76 | 19.91 | 19.91 | 81.16 | 81.16 |
| | Tailings | 53.24 | 100.00 | 4.06 | 11.47 | 18.84 | 100.00 |
| Addition of PESA after ore grinding | Concentrate | 44.49 | 44.49 | 19.24 | 19.24 | 74.71 | 74.71 |
| | Tailings | 55.51 | 100.00 | 5.22 | 11.46 | 25.29 | 100.00 |
| No addition of PESA to a mill | Concentrate | 39.83 | 39.83 | 18.28 | 18.28 | 63.62 | 63.62 |
| | Tailings | 60.17 | 100.00 | 6.92 | 11.44 | 36.38 | 100.00 |

Tongren City has rich manganese carbonate ore with a resource reserve of greater than 700 million tons, and the ore includes certain amounts of gangue minerals, such as quartz and clay minerals. The polyepoxysuccinic acid (PESA) is an effective descaling agent that is a water-soluble polymer with a low cost, convenience in use, biodegradability and green environmental protection. The agent can effectively react with metal ions, such as calcium ions, magnesium ions and iron ions, to generate water-soluble compounds, so that the problem of scale formation in recycling of backwater is effectively solved, inevitable calcium ions, magnesium ions and iron ions in electrolytic manganese operation can be reduced, and improvement of a subsequent electrolytic operation environment of the manganese concentrate is facilitated. In the present invention, the PESA is used as a regulator, which can effectively reduce an argillization phenomenon in ore grinding operation, reduce the covering or carrying of rhodochrosite by clay minerals, avoid a coarsening phenomenon caused by adhesion to surfaces of target minerals in magnetic separation, and effectively increase the grade and recovery rate of the magnetic separation concentrate. Dispersion characteristics of ore pulp are improved, convenience is provided for improving the capture efficiency of a magnetic medium for the rhodochrosite, more efficient separation of the target minerals is achieved, energy consumption is reduced, and the agent has great significance for development and utilization of the high clay type low-grade manganese carbonate ore.

Example 1

Representative sample ore I in Tongren City includes manganese-containing minerals including ropperite and kutnohorite, and gangue minerals mainly including clay minerals, quartz, dolomite and albite as well as small amounts of calcite and pyrite. The raw ore has a manganese grade of 11.43%, and the clay minerals mainly include illite and a small amount of chlorite, with a content of 23.10%. The sample ore was crushed, sieved to a particle size of less than 2 mm and evenly mixed; 200 g of the mixed sample ore was selected for ore grinding, with an ore grinding concentration of 66.7%, a PESA use amount of 0-800 g/t and an ore grinding fineness of less than 0.075 mm accounting for 54.53%; and a magnetic separation (1.0 T) test was carried out in a Slon-100 high gradient magnetic separator. Results are shown in Table 3. As flow characteristic of ore pulp are improved by the PESA, a yield of a manganese concentrate is increased to 50.30-51.08%, which is increased by about 5%; and a manganese recovery rate reaches 84.25-87.71%, which is increased by 7.01-7.75%. A magnetic separation process test involving one roughing (1.0 T) and one scavenging (1.4 T) was carried out under the condition that a use amount of the PESA was 800 g/t. Test results are shown in Table 4. A comprehensive manganese concentrate with a manganese grade of 16.92% and a recovery rate of 93.61% is obtained, where a manganese content in magnetic separation tailings is decreased to 1.66%, and a tailings discarding rate is 41.02%. Green decreased emission of manganese slag from the source is effectively achieved.

TABLE 3

| Comparative test of representative sample ore I in Tongren City | | | | | | | |
|---|---|---|---|---|---|---|---|
| Use amount of PESA/(g/t) | Product name | Yield/% | | Mn grade/% | | Mn recovery rate/% | |
| | | Individual | Accumulation | Individual | Accumulation | Individual | Accumulation |
| 0 | Concentrate | 45.56 | 45.56 | 17.58 | 17.58 | 75.51 | 75.51 |
| | Tailings | 54.44 | 100.00 | 4.77 | 10.61 | 24.49 | 100.00 |
| 200 | Concentrate | 50.30 | 50.30 | 17.88 | 17.88 | 84.34 | 84.34 |
| | Tailings | 49.70 | 100.00 | 3.36 | 10.66 | 15.66 | 100.00 |
| 400 | Concentrate | 51.08 | 51.08 | 17.69 | 17.69 | 84.32 | 84.32 |
| | Tailings | 48.92 | 100.00 | 3.38 | 10.63 | 15.68 | 15.68 |
| 600 | Concentrate | 50.68 | 50.68 | 17.59 | 17.59 | 84.25 | 84.25 |
| | Tailings | 49.32 | 100.00 | 3.38 | 10.58 | 15.75 | 100.00 |
| 800 | Concentrate | 50.94 | 50.94 | 18.48 | 18.48 | 87.71 | 87.71 |
| | Tailings | 49.06 | 100.00 | 2.69 | 10.73 | 12.29 | 100.00 |

TABLE 4

| Magnetic separation optimization test of representative sample ore I in Tongren City | | | | | | | |
|---|---|---|---|---|---|---|---|
| Test conditions | Product name | Yield/% | | Mn grade/% | | Mn recovery rate/% | |
| | | Individual | Accumulation | Individual | Accumulation | Individual | Accumulation |
| Magnetic field intensity 1.0 T, 1.4 T Use amount of PESA 800 g/t | Roughing concentrate | 51.09 | 51.09 | 18.45 | 18.45 | 88.44 | 88.44 |
| | Scavenging concentrate | 7.89 | 58.98 | 6.98 | 16.92 | 5.17 | 93.61 |
| | Scavenging tailings | 41.02 | 100.00 | 1.66 | 10.66 | 6.39 | 100.00 |

Example 2

Representative sample ore II in Tongren City includes manganese-containing minerals including ropperite and kutnohorite, and gangue minerals mainly including quartz, clay minerals, dolomite and albite as well as small amounts of pyrite and gypsum. The raw ore has a manganese grade of 10.66%, and the clay minerals mainly include illite, with a content of 19.30%. The sample ore was crushed, sieved to a particle size of less than 2 mm and evenly mixed; 200 g of the mixed sample ore was selected for ore grinding, with an ore grinding concentration of 66.7%, a PESA use amount of 0-800 g/t and an ore grinding fineness of less than 0.075 mm accounting for 62.71%; and a magnetic separation (1.0 T) test was carried out in a Slon-100 high gradient magnetic separator. Results are shown in Table 5. Compared with no addition of the PESA, the addition of PESA in ore grinding can significantly improve beneficiation indicators of a magnetic separation manganese concentrate, a yield of the manganese concentrate is 44.40-47.50% and is increased by 4.57-7.67%, and a manganese recovery rate is 73.87-79.88% and is increased by 10.25-16.26%. A magnetic separation process test involving one roughing (1.0 T) and one scavenging (1.4 T) was carried out under the condition that a use amount of the PESA was 600 g/t. Test results are shown in Table 6. A comprehensive manganese concentrate with a grade of 17.92% and a recovery rate of 92.92% is obtained, where a manganese content in magnetic separation tailings is decreased to 2.01%, and a tailings discarding rate is 40.46%. Green decreased emission of manganese slag from the source can also be effectively achieved.

TABLE 5

| Comparative test of representative sample ore II in Tongren City | | | | | | | |
|---|---|---|---|---|---|---|---|
| Use amount of PESA/(g/t) | Product name | Yield/% | | Mn grade/% | | Mn recovery rate/% | |
| | | Individual | Accumulation | Individual | Accumulation | Individual | Accumulation |
| 0 | Concentrate | 39.83 | 39.83 | 18.28 | 18.28 | 63.62 | 63.62 |
| | Tailings | 60.17 | 100.00 | 6.92 | 11.44 | 36.38 | 100.00 |
| 200 | Concentrate | 44.40 | 44.40 | 18.98 | 18.98 | 73.87 | 73.87 |
| | Tailings | 55.60 | 100.00 | 5.36 | 11.41 | 26.13 | 100.00 |
| 400 | Concentrate | 46.09 | 46.09 | 19.06 | 19.06 | 76.78 | 76.78 |
| | Tailings | 53.91 | 100.00 | 4.93 | 11.44 | 23.22 | 100.00 |
| 600 | Concentrate | 47.50 | 47.50 | 19.22 | 19.22 | 79.88 | 79.88 |
| | Tailings | 52.50 | 100.00 | 4.38 | 11.43 | 20.12 | 100.00 |

TABLE 5-continued

Comparative test of representative sample ore II in Tongren City

| Use amount of PESA/(g/t) | Product name | Yield/% Individual | Yield/% Accumulation | Mn grade/% Individual | Mn grade/% Accumulation | Mn recovery rate/% Individual | Mn recovery rate/% Accumulation |
|---|---|---|---|---|---|---|---|
| 800 | Concentrate | 47.05 | 47.05 | 19.05 | 19.05 | 78.30 | 78.30 |
| | Tailings | 52.95 | 100.00 | 4.69 | 11.45 | 21.70 | 100.00 |

TABLE 6

Magnetic separation optimization test of representative sample ore II in Tongren City

| Test conditions | Product name | Yield/% Individual | Yield/% Accumulation | Mn grade/% Individual | Mn grade/% Accumulation | Mn recovery rate/% Individual | Mn recovery rate/% Accumulation |
|---|---|---|---|---|---|---|---|
| Magnetic field intensity 1.0 T, 1.4 T Use amount of PESA 600 g/t | Roughing concentrate | 47.07 | 47.07 | 19.91 | 19.91 | 81.60 | 81.60 |
| | Scavenging concentrate | 12.47 | 59.54 | 10.42 | 17.92 | 11.31 | 92.92 |
| | Scavenging tailings | 40.46 | 100.00 | 2.01 | 11.48 | 7.08 | 100.00 |

Example 3

Representative sample ore III in Tongren City includes manganese-containing minerals including ropperite, and gangue minerals mainly including quartz, clay minerals, plagioclase and pyrite as well as small amounts of ankerite, gypsum, calcite and siderite. The raw ore has a grade of 12.66%, and the clay minerals mainly include illite and small amounts of illite/smectite mixed layer, chlorite and kaolinite, with a content of 18.91%. The sample ore was crushed, sieved to a particle size of less than 2 mm and evenly mixed; 200 g of the mixed sample ore was selected for ore grinding, with an ore grinding concentration of 66.7%, a PESA use amount of 0-800 g/t and an ore grinding fineness of less than 0.075 mm accounting for 70.02%; and a magnetic separation (1.0 T) test was carried out in a Slon-100 high gradient magnetic separator. Results are shown in Table 7. Compared with no addition of the regulator PESA, the addition of PESA in ore grinding can significantly improve beneficiation indicators of a magnetic separation manganese concentrate. A magnetic separation process test involving one roughing (1.0 T) and one scavenging (1.4 T) was carried out under the condition that a use amount of the PESA was 400 g/t. Test results are shown in Table 8. A comprehensive manganese concentrate with a grade of 18.04% and a recovery rate of 87.78% is obtained, and a tailings discarding rate of 38.51% can also be achieved for low-grade manganese carbonate ore with complex clay mineral composition.

TABLE 7

Comparative test of representative sample ore III in Tongren City

| Use amount of PESA/(g/t) | Product name | Yield/% Individual | Yield/% Accumulation | Mn grade/% Individual | Mn grade/% Accumulation | Mn recovery rate/% Individual | Mn recovery rate/% Accumulation |
|---|---|---|---|---|---|---|---|
| 0 | Concentrate | 36.19 | 36.19 | 18.73 | 18.73 | 53.54 | 53.54 |
| | Tailings | 63.81 | 100.00 | 9.22 | 12.66 | 46.46 | 100.00 |
| 200 | Concentrate | 41.26 | 41.26 | 19.13 | 19.13 | 62.39 | 62.39 |
| | Tailings | 58.74 | 100.00 | 8.10 | 12.65 | 37.61 | 100.00 |
| 400 | Concentrate | 41.90 | 41.90 | 19.37 | 19.37 | 64.17 | 64.17 |
| | Tailings | 58.10 | 100.00 | 7.80 | 12.65 | 35.83 | 100.00 |
| 600 | Concentrate | 42.27 | 42.27 | 19.32 | 19.32 | 64.48 | 64.48 |
| | Tailings | 57.73 | 100.00 | 7.79 | 12.66 | 35.52 | 100.00 |
| 800 | Concentrate | 42.22 | 42.22 | 19.31 | 19.31 | 64.28 | 64.28 |
| | Tailings | 57.78 | 100.00 | 7.84 | 12.68 | 35.72 | 100.00 |

TABLE 8

Magnetic separation optimization test of representative sample ore III in Tongren City

| Test conditions | Product name | Yield/% Individual | Yield/% Accumulation | Mn grade/% Individual | Mn grade/% Accumulation | Mn recovery rate/% Individual | Mn recovery rate/% Accumulation |
|---|---|---|---|---|---|---|---|
| Magnetic field intensity 1.0 T, 1.4 T Use amount of PESA 400 g/t | Roughing concentrate | 42.51 | 42.51 | 19.44 | 19.44 | 65.39 | 65.39 |
| | Scavenging concentrate | 18.98 | 61.49 | 14.91 | 18.04 | 22.40 | 87.78 |
| | Scavenging tailings | 38.51 | 100.00 | 4.01 | 12.64 | 12.22 | 100.00 |

What is claimed is:

1. A beneficiation method for high clay type low-grade manganese carbonate ore, comprising the following steps:

step 1: preparing polyepoxysuccinic acid (PESA) into a solution;

step 2: adding raw ore to a mill, wherein the raw ore is the high clay type low-grade manganese carbonate ore with a clay mineral content of 18-24 wt % and a manganese grade of 10-13%, adding 200-800 grams per ton (g/t) of the PESA to the mill, and performing ore grinding on the raw ore to yield an ore grinding product, wherein an ore grinding fineness of less than 0.075 mm accounts for 54-70 wt % of the ore grinding product; and step 3: sending the ore grinding product obtained in the step 2 to a magnetic separation operation, and performing a separation process involving one roughing and one scavenging by a high gradient magnetic separator to obtain a comprehensive manganese concentrate with a high grade and a high recovery rate.

2. The beneficiation method for high clay type low-grade manganese carbonate ore according to claim 1, wherein in the step 1, the PESA is prepared into the solution with a concentration of 0.004 g/L.

3. The beneficiation method for high clay type low-grade manganese carbonate ore according to claim 1, wherein in the step 3, the one roughing is performed in a magnetic field intensity range of 0.9-1.1 T, the one scavenging is performed in a magnetic field intensity range of 1.3-1.5 T, and the high gradient magnetic separator has a magnetic medium of 2.5 mm and a magnetic separation pulsation frequency of 100-150 revolutions per minute (r/min).

* * * * *